(12) United States Patent
Binder et al.

(10) Patent No.: US 10,514,310 B2
(45) Date of Patent: Dec. 24, 2019

(54) MEASURING ASSEMBLY FOR MEASURING THE TORQUE ON A SHAFT, CRANK DRIVE, AND VEHICLE

(71) Applicant: Robert Bosch GmbH, Stuttgart (DE)

(72) Inventors: Julian Binder, Moessingen (DE); Sigmund Braun, Kusterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 109 days.

(21) Appl. No.: 15/743,977

(22) PCT Filed: May 25, 2016

(86) PCT No.: PCT/EP2016/061753
§ 371 (c)(1),
(2) Date: Jan. 11, 2018

(87) PCT Pub. No.: WO2017/012753
PCT Pub. Date: Jan. 26, 2017

(65) Prior Publication Data
US 2018/0202876 A1    Jul. 19, 2018

(30) Foreign Application Priority Data
Jul. 23, 2015 (DE) .................. 10 2015 213 902

(51) Int. Cl.
*G01L 3/10* (2006.01)
*B62M 3/16* (2006.01)
(Continued)

(52) U.S. Cl.
CPC ............... *G01L 3/102* (2013.01); *B62M 3/16* (2013.01); *B62M 6/50* (2013.01); *B62J 2099/002* (2013.01)

(58) Field of Classification Search
CPC .. G01L 3/102; B62M 3/16; B62M 6/50; B62J 2099/002
(Continued)

(56) References Cited

U.S. PATENT DOCUMENTS

| 7,234,684 B2 * | 6/2007 | Kohlenberg | B66C 13/16 254/274 |
| 8,593,161 B2 * | 11/2013 | Kato | B60J 1/17 324/326 |
| 8,939,247 B2 * | 1/2015 | Aydogan | B62M 6/50 180/206.3 |

FOREIGN PATENT DOCUMENTS

| DE | 102009008074 A1 * | 8/2010 | ............. G01L 3/102 |
| DE | 102009008074 A1 | 8/2010 | |

(Continued)

OTHER PUBLICATIONS

International Search Report dated Aug. 22, 2016, of the corresponding International Application PCT/EP2016/061753 filed May 25, 2016.

*Primary Examiner* — Octavia Hollington
(74) *Attorney, Agent, or Firm* — Norton Rose Fulbright US LLP; Gerard Messina

(57) ABSTRACT

A measurement assemblage for measuring the torque on a shaft, and in particular the torsional moment of the shaft, having a sensor device that is configured to measure a magnetic field carried or generated by the shaft; a sensor holder for holding the sensor device and for disposing the sensor device with respect to a region of an outer circumferential surface of the shaft; and at least one force element that is configured to dispose the sensor holder, by force impingement, in stationary fashion with respect to the region of the outer circumferential surface of the shaft, the at least one force element being configured to exert a tensile force on the sensor holder in such a way that the sensor holder is (Continued)

pulled against the region of the outer circumferential surface of the shaft as a result of the tensile force.

22 Claims, 5 Drawing Sheets

(51) Int. Cl.
  *B62M 6/50* (2010.01)
  *B62J 99/00* (2009.01)
(58) Field of Classification Search
  USPC .................................... 73/862.331–862.338
  See application file for complete search history.

(56) References Cited

FOREIGN PATENT DOCUMENTS

| | | | | |
|---|---|---|---|---|
| DE | 102012214332 A1 * | 2/2014 | ............... | G01L 3/24 |
| DE | 102012214332 A1 | 2/2014 | | |
| JP | S6333634 A | 2/1988 | | |
| JP | S6333634 B2 * | 7/1988 | ........... | F25J 3/04745 |
| JP | H02140339 U | 11/1990 | | |
| JP | 5837052 B2 | 12/2015 | | |

* cited by examiner

MEASURING ASSEMBLY FOR MEASURING THE TORQUE ON A SHAFT, CRANK DRIVE, AND VEHICLE

FIELD

The present invention relates to a measurement assemblage for measuring the torque on a shaft, to a crank drive, and to a vehicle. It relates in particular to a measurement assemblage for measuring the torsional moment of a shaft, to a crank drive for a vehicle operable with muscle power and/or motor power, and to a vehicle operable with muscle power and/or motor power.

BACKGROUND INFORMATION

Electric vehicles and/or those operable with muscle power are available in various embodiments. With such vehicles, it is often desirable to ascertain a twisting moment or torque acting on a shaft. The magnetostriction effect, magnetoelasticity effect, or inverse magnetostriction or magnetoelasticity effect can be utilized in this context. This effect is based on the deformation of magnetic, in particular ferromagnetic, substances as a result of an applied magnetic field. A corresponding body experiences, at constant volume, an elastic change in length. With inverse magnetostriction or magnetoelasticity, conversely, the magnetic properties are modified by an impressed change in length or shape.

This can be utilized in order to determine the torque that is acting on a shaft. For this, a portion of the shaft is configured with or from a material that exhibits the inverse magnetostriction or magnetoelasticity effect.

It is problematic, however, that a specific distance exists between that portion of the shaft and a sensor that is intended to measure the magnetic field and the change therein, since the sensor is disposed, along with a sensor holder, outside the shaft that is to be measured. If the sensor and sensor shaft, i.e. the shaft whose torque or torsional moment is to be determined and which is correspondingly configured with the magnetostrictive material, are not oriented in consistently concentric fashion with respect to one another, static measurement deviations in the sensor signal can then occur due to a differing distance or air gap between the sensor and sensor shaft.

In addition, dynamic errors can also occur due to errors in the concentricity and coaxiality of the shaft, and can negatively influence the sensor signal and the evaluation thereof.

SUMMARY

The measurement assemblage according to the present invention may have the advantage that the distance or air gap between the sensor holder and sensor on the one hand, and the shaft to be measured on the other hand, can be made particularly small or can in fact be minimized, and that changes therein upon rotation of the shaft can likewise be kept particularly small or can in fact be compensated for. This is achieved according to the present invention by way of a measurement assemblage for measuring the torque on a shaft, and in particular the torsional moment of the shaft, which assemblage is configured with a sensor device that is configured to measure a magnetic field carried or generated by the shaft, with a sensor holder for holding the sensor device and for disposing the sensor device with respect to a region of an outer circumferential surface of the shaft, and with at least one force element that is configured, in particular in the installed state of the measurement assemblage, to dispose the sensor holder, by force impingement, in stationary fashion with respect to the region of the outer circumferential surface of the shaft and in particular in a manner that is stable over time in terms of position, orientation, and/or distance.

In addition, the at least one force element is configured to exert a tensile force on the sensor holder in such a way that the sensor holder is pulled against the region of the outer circumferential surface of the shaft as a result of the tensile force. This makes possible a particularly close disposition of the sensor holder of the measurement assemblage according to the present invention, and the sensor device received therein, with reference to the region of the outer circumferential surfaces of the shaft to be measured, in order to measure the carried or generated magnetic field thereof and/or changes therein.

As a result of the tensile force element, the sensor is set against the surface of the shaft to be measured. It is thereby possible to avoid an enlarged air gap, which can occur due to a tolerance chain of the assemblage resulting in turn from fixed housing installation and from production tolerances. In addition, concentricity errors and tilts of the shaft, and therefore angular errors, can be compensated for according to the present invention by way of the combination of sensor holder and force element.

Preferred refinements of the present invention are described herein.

In an advantageous embodiment of the measurement assemblage according to the present invention, the at least one force element is configured to act with the tensile force on an outer side, facing toward the shaft, of the sensor holder. This feature yields a particularly simple configuration for the measurement assemblage according to the present invention, since in a context of tensile forces, assemblages having no bracing points are usable on an external housing.

It is particularly advantageous if the at least one force element is embodied as an elastic force element, in particular as a resilient element or the like. These features result in a particularly high degree of reproducibility for the measurement assemblage, since the force element can adjust itself to the respective load because of its elasticity.

In a further embodiment of the measurement assemblage according to the present invention, the at least one force element according to the present invention has at least one holding arm. The at least one holding arm is coupled to the sensor holder, and extends in an effective direction of the tensile force and toward a side of the shaft facing away from the sensor holder. The at least one holding arm surrounds the shaft in the latter's circumferential direction, and is braced there on the outer circumferential surface of the shaft, in particular with a distal end of the holding arm. The at least one holding arm is preloaded in such a way that it exerts the tensile force on the sensor holder by way of the coupling to the sensor holder and by way of the bracing against the outer circumferential surface of the shaft. The reproducibility of the results of the measurement assemblage, and their accuracy, are further enhanced by these features.

Although a single holding arm is sufficient to bring about the advantages according to the present invention, so long as it defines a corresponding buttress to constitute a tensile force, it is particularly advantageous if not just a single holding arm is used. In a refinement of the present invention, a pair of holding arms is therefore embodied. The holding arms of the pair lie or stand opposite one another with reference to the sensor holder and the shaft, and are coupled to the sensor holder at oppositely located points on the sensor holder. They surround the shaft in opposite directions in the latter's circumferential direction. What results from the provision of a pair of holding arms, which in particular are constructed identically and preferably in mirror-symmetrical fashion with respect to one another, is a symmetrical disposition of the measurement assemblage, which results in a symmetrical force distribution in the context of holding of the sensor holder and of the sensor device. The symmetry yields an additionally enhanced degree of accuracy and reproducibility for the measurement results.

A particularly simple form of manufacture, but also of assembly, results if the number of components of the measurement assemblage which are to be produced and assembled is minimized. In a preferred embodiment this achieved by the fact that the holding arm, or the pair of holding arms, is connected to the sensor holder in particular in materially integral form. The holding arm or the pair of holding arms can abut against the outer circumferential surface of the shaft with the arm surfaces or portions thereof which face toward the outer circumferential surface of the shaft, and/or can surround the shaft in its circumferential direction by a total of more than 180° and less than 360°.

It is particularly advantageous if the sensor holder forms at least one bearing point, which is embodied in particular as a half-shell bearing and/or is set resiliently against the region of the outer circumferential surface of the shaft by the at least one force element. This results in particular simple assembly of the underlying sensor holder of the sensor assemblage. The number of parts to be assembled can furthermore be reduced by integrating the measurement assemblage into a bearing.

The measurement assemblage's influence on the shaft can be minimized by embodying a bearing point having one or more contact points between the shaft and sensor holder.

The mutual influence and friction, and therefore wear, between the measurement assemblage and the shaft to be measured can be kept particularly low if the contact points are embodied as plain bearings and/or plain bushings or flange bushings, preferably as elements inserted into the sensor holder and/or by the fact that the sensor holder as a whole, or a region of the sensor holder which faces toward the shaft, is embodied with or from a low-friction material.

An embodiment having slotted flange bushings to define the contact points is possible in this context. The (straight or oblique) slotted flange bushing can be inserted on one side. It can then cover the entire width of the bearing point. This offers the advantage of simplified assembly of the subassembly, since the operation of inserting the torsion shaft into a sensor holder is simplified.

The flange defines the axial location of the bushing and, thanks to a cutout, can act as a twist preventer between a plain bearing and the sensor holder.

Particularly simple assembly of the measurement assemblage according to the present invention results from the fact that the plain bearings and/or plain bushings are embodied as partial circle segments each having an arc of less than 180°.

The reliability of the measurement assemblage according to the present invention can be enhanced by the fact that a twist preventer is embodied to prevent the sensor holder from rotating along with the shaft. The twist preventer can be part of the sensor holder and/or can have one or more orifices or ribs. What is achieved by way of these features is that the position of the measurement assemblage according to the present invention does not change during operation.

A particularly high degree of accuracy in the measurement results of the measurement assemblage according to the present invention is obtained by the fact that the region of the outer circumferential surface of the shaft is constituted by a torsion element, in particular a torsion shaft, having or made of a magnetostrictive and/or magnetoelastic material that is configured for torque transfer as an intermediate shaft piece between first and second shaft segments of the shaft. The use of a magnetostrictive and/or magnetoelastic material makes possible, by way of corresponding calibration, a very accurate determination of the torque to be transferred, or the torsional moment experienced, by the shaft.

According to a further aspect of the present invention, a crank drive for a vehicle operable with muscle power and/or motor power, and in particular for an electric bicycle, is created, which drive has a shaft that is configured for reception of and nonrotatable coupling to at least one crank for torque transfer. A measurement assemblage according to the present invention is furthermore embodied to measure the torque at the shaft and in particular the torsional moment of the shaft.

Due to these features, a particularly compact design can be achieved by integrating the measurement assemblage according to the present invention into the crank drive.

According to another aspect, the present invention provides a vehicle operable with muscle power and/or motor power, in particular an electric bicycle. The latter encompasses a crank drive according to the present invention, an electric drive system that is disposed in particular in the region of the crank drive, and a control unit that is configured to control the electric drive system.

BRIEF DESCRIPTION OF THE DRAWINGS

Preferred exemplifying embodiments of the present invention are described below with reference to the figures.

DETAILED DESCRIPTION OF EXAMPLE EMBODIMENTS

Further general aspects and exemplifying embodiments of the present invention are described in detail below with reference to the Figures.

Figure 1:
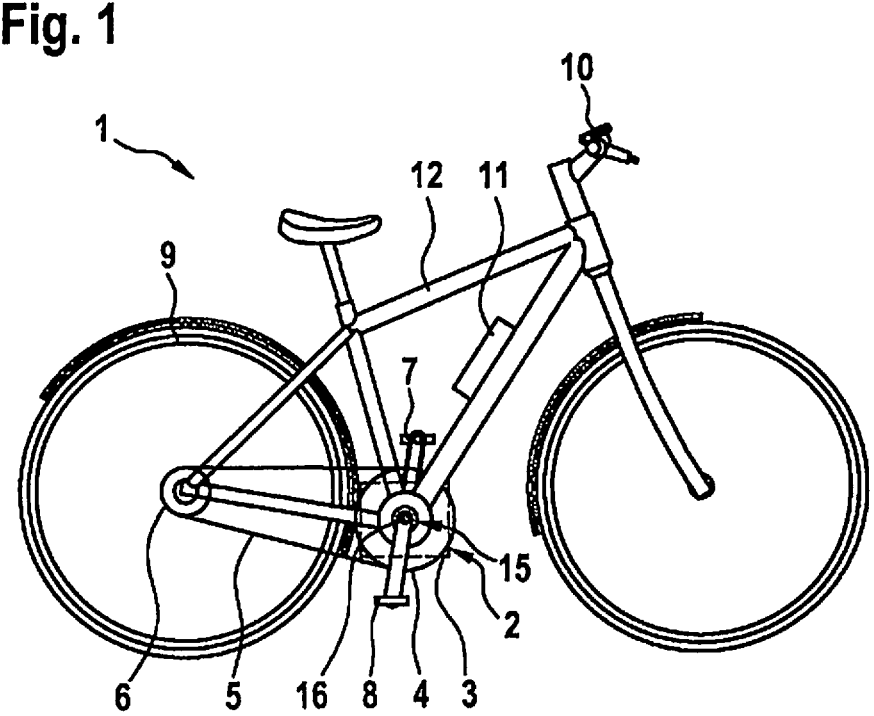
FIG. 1 schematically depicts an example of a vehicle, in the form of an electric bicycle, in which a first example embodiment of the present invention is implemented.

An electric bicycle 1, constituting a preferred embodiment of the vehicle according to the present invention, will firstly be described in detail with reference to FIG. 1.

Electric bicycle 1 encompasses a crank drive 2 having two cranks 7, 8 on which pedals are disposed. An electric drive system 3 is integrated into crank drive 2. A manually shifted transmission 6 is disposed on rear wheel 9.

A drive torque, which is furnished by the rider and/or by electric drive system 3, is transferred from a chainring 4 on crank drive 2, via a chain 5, to sprockets of manually shifted transmission 6, and from the manually shifted transmission to rear wheel 9.

Also encompassed in this context are hub transmissions and derailleur transmissions, each having a corresponding power flow via the shifting mechanism and in particular via the sequence of chain, shifting mechanism, pinion, and hub as part of the rear wheel.

A control unit 10 that is connected to electrical drive system 3 is also disposed on the handlebars of the bicycle. The reference character 11 designates a battery that serves to supply power to electrical drive system 3.

Integrated into frame 12 is crank bearing 15, or an internal bearing or bottom bracket, which has a crank housing 60 inside which an embodiment of the measurement assemblage according to the present invention is configured.

Figure 2:
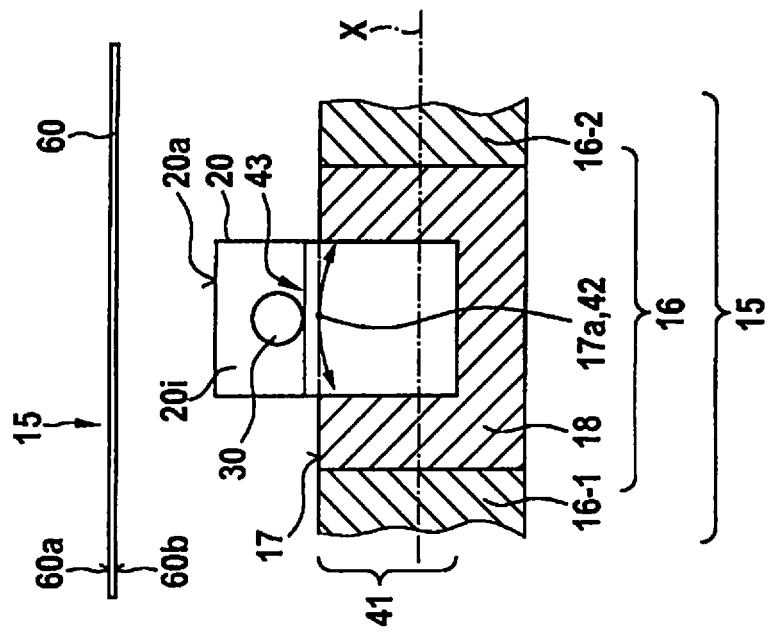
FIGS. 2 and 3 are schematic sectioned views of an example embodiment of the measurement assemblage according to the present invention, respectively as a cross section and as a longitudinal section with reference to the underlying shaft.
Figure 3:
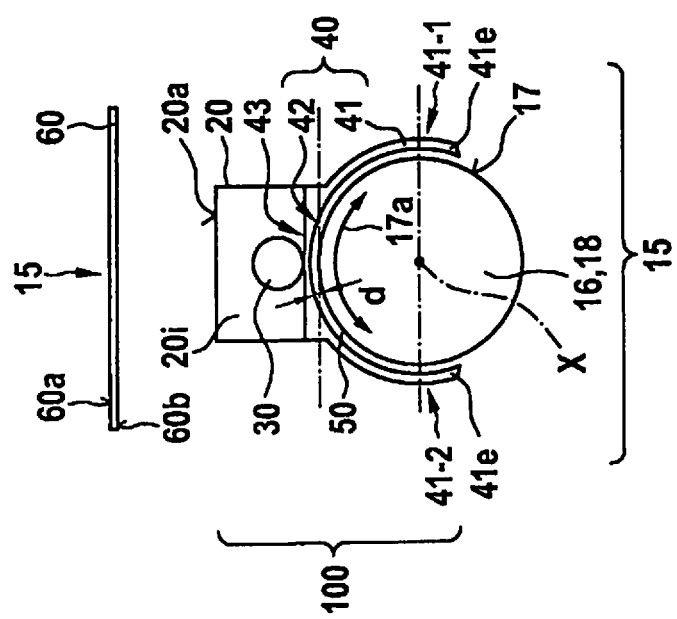

FIGS. 2 and 3 schematically show respectively a cross section and a longitudinal section of an embodiment of measurement assemblage 100 according to the present invention, specifically sectioned with reference to the respective underlying shaft 16. The state depicted is one in which measurement assemblage 100 is installed in crank housing 60 of a crank bearing 15, internal bearing, or bottom bracket.

Measurement assemblage 100 of this embodiment has a sensor holder 20. The latter can also be referred to as a "sensor housing," and receives in its interior 20i a sensor device 30, for example in the form of a magnetic field sensor. Sensor holder 20 faces toward a shaft 16 with a portion of its outer side 20a, and is disposed in physical proximity to a segment 17a of an outer circumferential surface 17 of shaft 16, with a gap 50 in the form of an air gap between them. Sensor device 30 is thus located relatively close to the region or segment 17a of outer circumferential surface 17. Sensor device 30 can therefore measure the magnetic properties, and in particular the magnetic field carried or generated by shaft 16 and/or changes in the field, in region 17a.

Embodied on that side of outer side 20a of sensor holder 20 which faces toward shaft 16 is a force element 41 having a pair of holding arms 41-1 and 41-2, which are coupled at one of their ends to sensor holder 20 and connected thereto.

First and second holding arms 41-1 and 41-2 of the arm pair, constituting force element 41, have distal ends 41e. These are ends that are farthest away from sensor element 20 and from the attachment point thereto. These distal ends 41e form, or are located in outermost segments of, holding arms 41-1, 41-2; with those segments, holding arms 41-1, 41-2 surround outer circumferential surface 17 of shaft 16, and in particular torsion element 18, from opposite sides in order to be braced there at least in part via bearing points 42.

Force element 41 having elastic holding arms 41-1, 41-2 is embodied in such a way that with measurement assemblage 100 in the assembled state, said element impinges upon sensor holder 20 with a tensile force and thus pulls sensor holder 20 against region 17a of outer circumferential surface 17 of shaft 16 and disposes it in terms of position, orientation, and/or distance in a manner that is stable over time.

Shaft 16 is embodied rotationally symmetrically around its rotation axis X, and is rotatable around that rotation axis X.

In this embodiment, shaft 16 is made up of a first and a second shaft segment 16-1 and 16-2, which serve for torque transfer. A torsion element 18, which can also be referred to as a "torsion shaft," is disposed between first shaft segment 16-1 and second shaft segment 16-2 for torque transfer between those shaft segments 16-1, 16-2. The torsion element is constituted with or from a magnetostrictive and/or magnetoelastic material.

Upon transfer of a torque between the first and second shaft segments 16-1 and 16-2, torsion element 18 is therefore also exposed to that transferred torque, which acts there as a torsional moment. The torque therefore results in a deformation, in the sense of a torsion, of torsional element 18. As a result of the (inverse) magnetostrictive and/or magnetoelastic properties of the underlying material of torsion element 18, the deformation of torsion element 18 results in a change in the magnetic field carried and/or generated by torsion element 18.

This change in the magnetic field can be measured by sensor device 30 and by the magnetic field sensor. From the measurement of the change in the magnetic field, conclusions can then be drawn as to the actual torsional moment that is acting or the torque that is being transferred.

A distance or gap 50, having a gap distance or gap width d, is constituted between sensor holder 20 and shaft 16. Thanks to the compressive force of force element 41 and the contact pressure of outer side 20a against region 17a of outer circumferential surface 17 of shaft 16, and in particular of torsion element 18, this gap width d of gap 50 is kept constant and, in particular, kept small, specifically as compared with a corresponding assemblage not having a force element 41.

Sensor holder 20 constitutes for that purpose a bearing point 42, in the sense of a plain bearing, with respect to region 17a of outer circumferential surface 17 of shaft 16.

Force element 41 and bearing point 42 can be construed, in combination, as a holding and bearing assemblage 40 for sensor holder 20 on region 17a of outer circumferential surface 17 of shaft 16.

As shown in FIG. 3, first and second holding arms 41-1, 41-2 cannot be further subdivided laterally or in an axial direction. In the embodiment according to FIGS. 2 and 3, first and second arms 41-1 and 41-2 are respectively designed to be as wide as the extension of sensor holder 20 in the direction of axis of symmetry X. This is not, however, an obligatorily necessary configuration.

Figure 4:
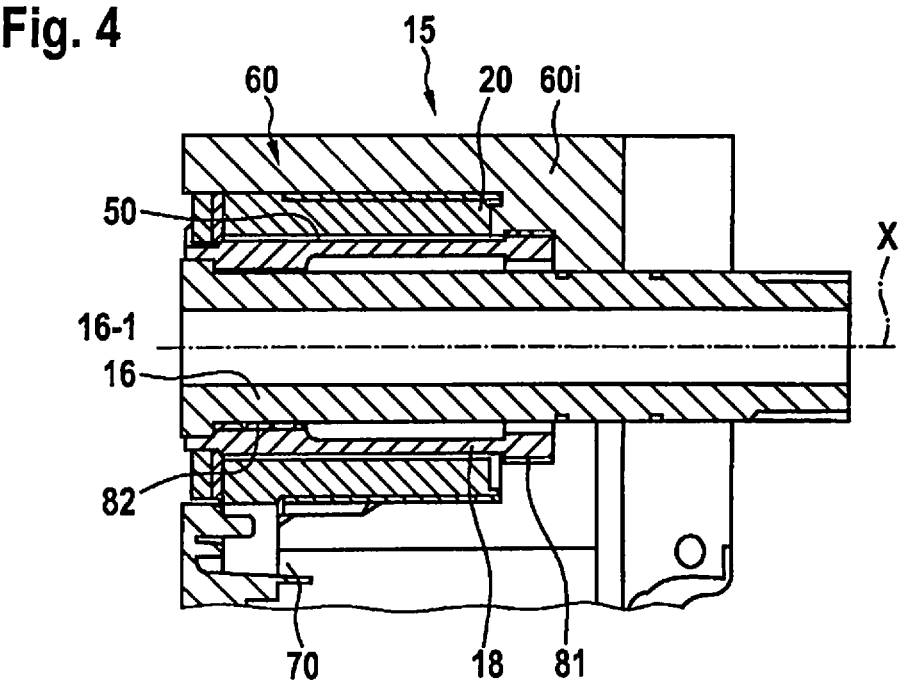
FIGS. 4 and 5 are perspective views, respectively cross-sectioned and longitudinally sectioned with reference to the shaft, of an example embodiment that can be refined with a measurement assemblage according to the present invention.
Figure 5:
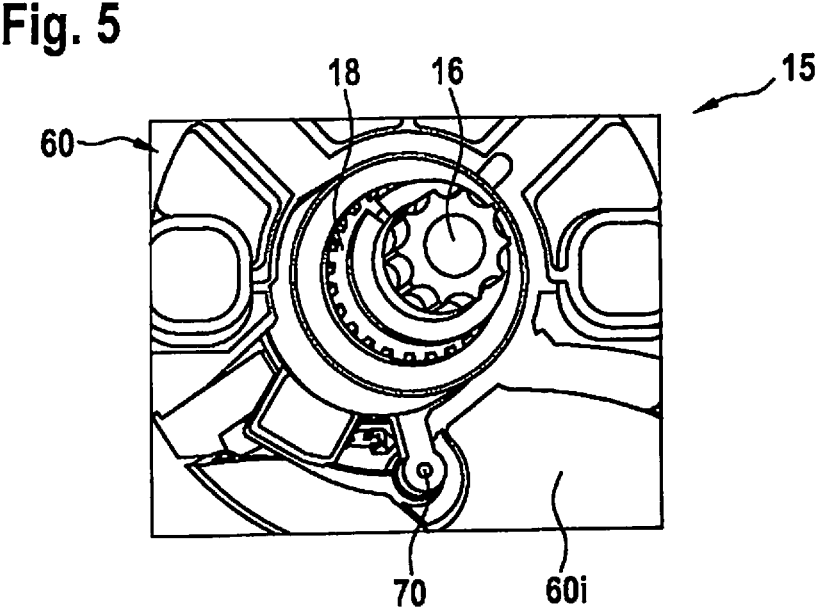

FIGS. 4 and 5 show an embodiment of a crank housing 60 that can be refined according to the present invention.

In the case of such a refinement, according to the present invention measurement assemblage 100 is likewise disposed in interior 60i of a crank housing 60. With this embodiment, torsion element 18 is embodied as a torsion sleeve and is connected respectively via first and second tooth sets 81 and 82 to crankshaft 16 for torque introduction, and to a transmission element for torque output.

A transmission element of this kind contains, for example, a freewheel, so that only torsional moments in one direction act on the torsion shaft constituting torsion element 18. A transmission section, which links the electric motor of an electric bicycle to the chainring for force transfer, could also be provided in this case.

Provided once again between torsion element 18 and sensor holder 20 is a gap 50 that, because of the configuration according to the present invention of force element 41, is constant over time in terms of its width d and/or is particularly small as compared with a corresponding assemblage not having a force element 41.

Fixed positioning and/or orientation of sensor holder 20 with reference to crank housing 60 on the one hand and with reference to shaft 16 on the other hand is ensured during operation by a twist preventer in the form of a bolt-down point.

Figure 6:
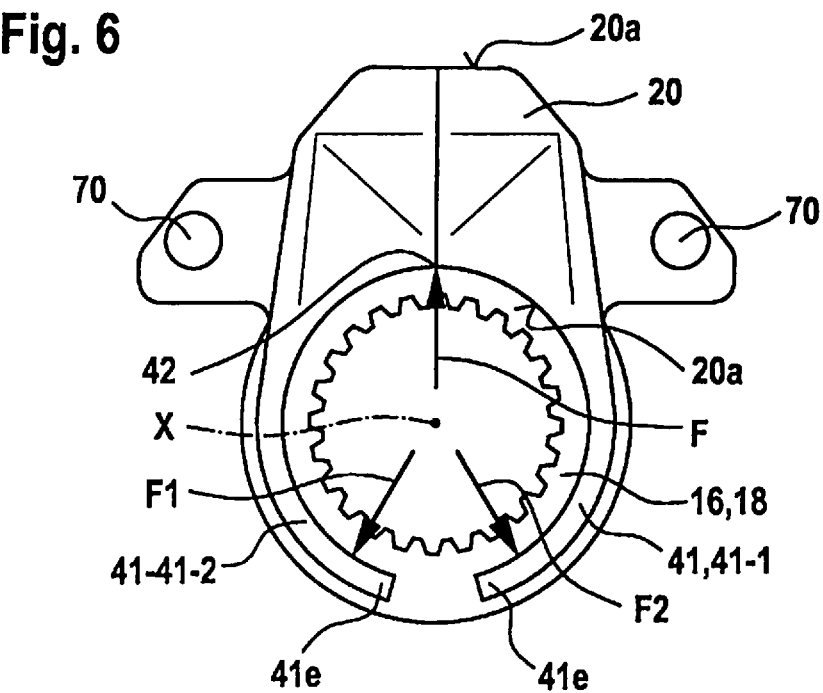
FIGS. 6 and 7 are highly schematic views, in perspective and respectively in radial and axial partial section, of a further example embodiment of the measurement assemblage according to the present invention.
Figure 7:
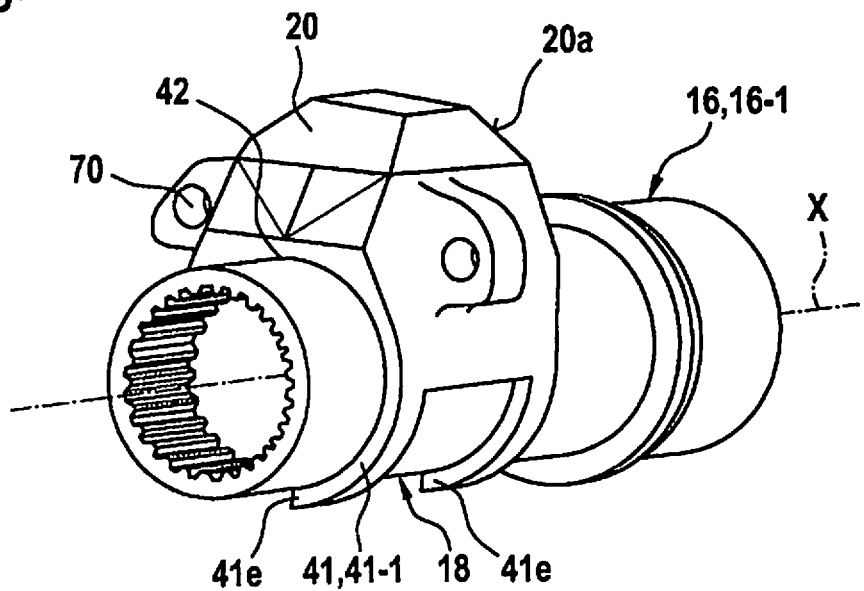

FIGS. 6 and 7 are schematic, perspective, and partly sectioned views of another embodiment of measurement assemblage 100 according to the present invention.

Holding and bearing assemblage 40 is constituted by bearing points 42 and force element 41. Bearing points 42 ensure contact, in the sense of a plain bearing, between sensor housing 20 on the one hand and region 17a outer circumferential surface 17 of shaft 16 and in particular of torsion element 18.

Force element 41 is once again attached with its holding arms 41-1, 41-2 on that outer side 20a of sensor holder 20 which faces toward shaft 16, such that the sensor holder wraps around or surrounds shaft 16 from opposite sides at its distal ends 41e, and is at least partly braced in region 17a of outer circumferential surface 17 of the shaft and of the torsion element. Applied pressure forces or arm forces F1 and F2, with which a corresponding resulting application force F is generated as a counter-force, are exerted by holding arms 41-1, 41-2.

As compared with the configuration according to FIG. 3 having one-piece holding arms 41-1, 41-2, with the embodiment according to FIG. 7 each of holding arms 41-1, 41-2 is subdivided in an axial direction into two prong-shaped sub-arms or arm segments. A configuration of this kind increases the mechanical flexibility of force element 41 as a whole, and thereby enhances elastic behavior as sensor holder 20 is held against outer circumferential surface 17 of shaft 16 and of torsion element 18.

Because of the frictional forces existing, despite the plain-bearing properties of bearing points 42, between outer circumferential surface 17 of shaft 16 and of torsion element 18 on the one hand, and that outer side 20a of sensor holder 20 which faces toward shaft 16 on the other hand, the provision of a twist preventer 70 is advantageous. It can be constituted, for example, by fastening sensor holder 20 on a region of crank housing 60. It ensures nonrotating positioning of sensor holder 20 in crank housing 60 and with respect to shaft 16 and torsion element 18.

The two arms 41-1 and 41-2 of sensor holder 20 can be pushed outward by sliding in or inserting a shaft 16 that is larger in terms of outside diameter and with respect to the inside diameter of arms 41-1 and 41-2.

Because of the stipulated elasticity of the material of sensor holder 20, an applied pressure force F1 and F2, which sets sensor holder 20 against bearing point 42 with the resulting force F, is produced for each arm 41-1, 41-2, as has been described above. The contact points of bearing point 42 between shaft 16 and sensor holder 20 can be embodied as plain bearings, sliding rings, flange bushings, or plain bushings. They can be embodied as portions of a partial circle or as a slotted ring and/or having a slot in straight or oblique form; the slot can also be constituted by a parting line between distal ends or laterally, for example at the 3-o'clock or 9-o'clock positions. It is also possible to select a configuration in which the entire holder is constituted from a low-friction material, preferably a plastic, or from two components: a low-friction material for bearing point 42 and holding arms 41-1, 41-2, and a shaped material for the receptacle, the housing, and the holders.

As shown in FIGS. 6 and 7, sensor holder 20 is equipped with a sensor head and can be set in place by way of an elastic element, constituting force element 41, that is braced and preloaded in the housing and has two holding arms 41-1, 41-2 that exert tensile forces.

The actual sensor holder 20 or its housing can be embodied with or from two half-shell-shaped bearing shells and can sit on shaft 16 constituting a sensor shaft and be pulled on by the force element. In addition to holding arms 41-1, 41-2, the half-shell-shaped bearing shells of sensor holder 20 also surround shaft 16. Holding arms 41-1, 41-2 surround shaft 16 in particular over a total angle of less than 180°, thereby simplifying assembly.

Bearing points 42 furnish contact points between shaft 16 on the one hand and sensor holder 20, force element 41, and its holding arms 41-1, 41-2 on the other hand, and can be embodied as plain bearings or plain bushings that are inserted into sensor holder 20 and/or into force element 41 and encompass as partial circle segments, for example, on average a maximum angle of 180°.

Sensor holder 20 and/or force element 41 can be made entirely of a low-friction material, preferably of a plastic. It can also, however, be made from two components, for example a low-friction material for bearing points 42 and/or holding arms 41-1, 41-2 and a shaped material for receptacle 43, the housing, and the mounts.

Two orifices, which define a provisional position of sensor holder 20 in housing 60, can be used as a twist preventer 70. Optionally, ribs or individual orifices can also serve as twist preventer 70.

It is also possible to provide a negative outer contour of sensor holder 20 in the housing, resulting in a positive fit, with clearance, with the housing.

Possible areas of application of the invention are, among others, all uses in which a torque measurement by way of an (inverse) magnetostrictive and/or magnetoelastic effect is accomplished or is conceivable. Utilization is an option in particular where specific requirements exist in terms of sensor position with reference to shaft 16 that is to be measured. Utilization in bicycles or pedelecs is particularly preferred.

It is also possible for contact points 42 to be embodied as plain bearings, slide rings, plain bushings, and/or flange bushings.

Additionally or alternatively, provision can also be made that twist prevention for the sliding elements with respect to sensor holder 20 is defined by positive fitting, joining, and/or adhesive bonding, or by friction, a higher coefficient of friction being embodied between sensor holder 20 and the slide element than between the slide element and torsion element 18 of the torsion shaft.

With regard to the low-friction materials to be used, it is possible in principle to use all available materials that exhibit a lower coefficient of friction with respect to torsion element 18 and/or possess a lower modulus of elasticity.

Typical coefficients of friction of usable polymers are in the range from 0.04 and 0.25. It is possible to use low-friction thermoplastics, e.g., PTFE, Teflon, etc., in particular as a low-friction layer in film form or the like.

Figure 8:
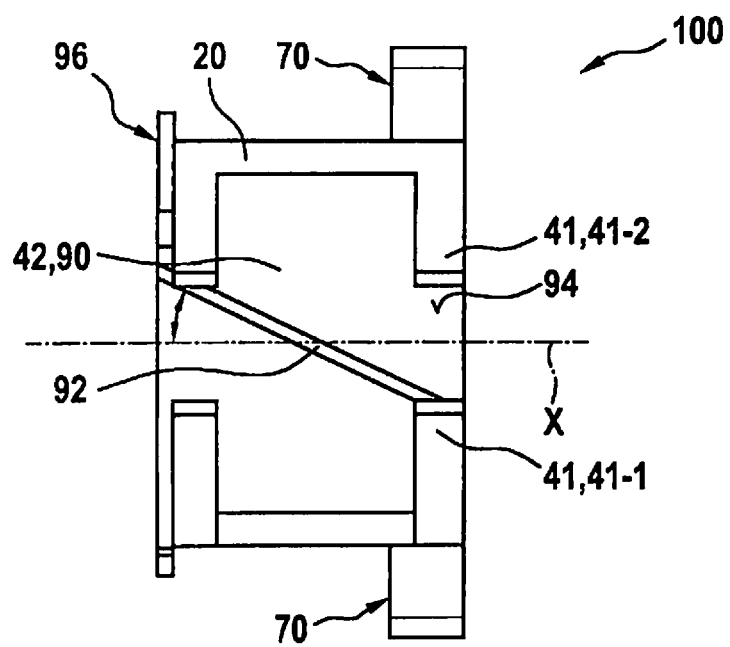
FIGS. 8 and 9 are respectively a lateral and an oblique perspective view of another example embodiment of the measurement assemblage according to the present invention.
Figure 9:
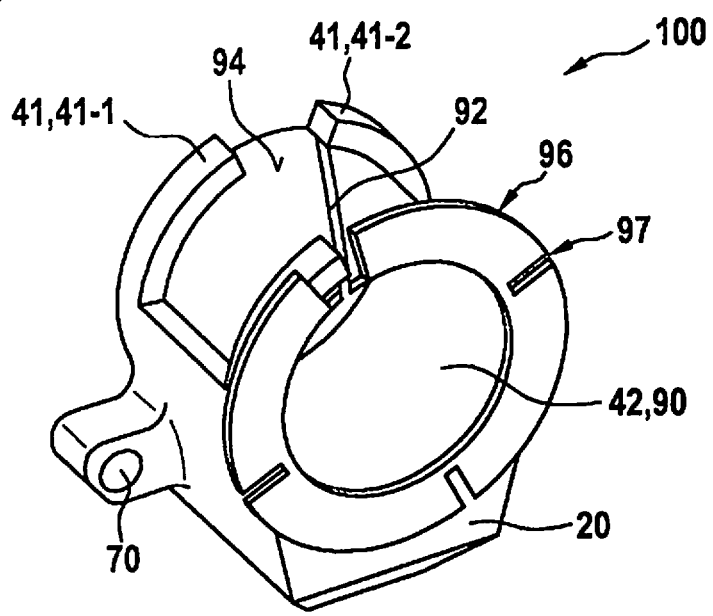

FIGS. 8 and 9 show, in a perspective side view and oblique view, another embodiment of measurement assemblage 100 in which bearing point 42 is constituted by a sleeve 90 that is embodied entirely, or at least on its inner side, with a low-friction material. Sleeve 90 is made up substantially of a sleeve jacket 94 that has one or several slots 92 for better adaptation of the inner circumference of sleeve 90 to shaft 16 that is to be surrounded, in particular to torsion element 18. Sleeve 90 can be inserted, for example, from a side of sensor holder 20 facing away from twist preventer 70 and holding arms 41-1 and 41-2 of force element 41; in the inserted state, a rim or flange 96 of sleeve 90 is braced externally against force element 41 and in particular against first and second arm 41-1, 41-2.

In the embodiments shown in FIGS. 8 and 9, slot 42 is oblique, i.e. embodied with an angle with respect to the axis of symmetry and rotation axis X. Also conceivable, however, are slots 92 that extend parallel to the axis of symmetry or rotation axis.

In the completely assembled state, holding arms 41-1 and 41-2 of force element 41 surround sleeve 90 that constitutes the contact points or bearing points 42, which sleeve in turn is in contact on its inner side with torsion element 18 of crankshaft 16.

What is claimed is:

1. A measurement assemblage for measuring a torsional moment of a shaft, comprising:
    a sensor device configured to measure a magnetic field carried or generated by the shaft;
    a sensor holder to hold the sensor device and to dispose the sensor device with respect to a region of an outer circumferential surface of the shaft; and
    at least one force element configured to dispose the sensor holder, by force impingement, in stationary fashion with respect to the region of the outer circumferential surface of the shaft, the at least one force element having at least one holding arm, the at least one holding arm being integrally connected to the sensor holder, surrounding the shaft in a circumferential direction of the shaft and being braced there on the outer circumferential surface of the shaft, the at least one force element being configured to exert a tensile force on the sensor holder so that the sensor holder is pulled against the region of the outer circumferential surface of the shaft as a result of the tensile force;
    wherein at least one of the sensor holder and the force element form at least one bearing point,
    wherein the at least one bearing point defines one or more contact points between the shaft and the sensor holder,
    wherein the contact points are embodied as at least one of plain bearings and plain bushings, and
    wherein the at least one of the plain bearings and plain bushings are constituted by a sleeve, which is insertable into the force element.

2. The measurement assemblage as recited in claim 1, wherein the at least one force element is configured to act with the tensile force on an outer side of the sensor holder, facing toward the shaft.

3. The measurement assemblage as recited in claim 1, wherein the at least one force element is an elastic force element.

4. The measurement assemblage as recited in claim 1, wherein the at least one holding arm extends in an effective direction of the tensile force and toward a side of the shaft facing away from the sensor holder, surrounding the shaft in the circumferential direction of the shaft and is braced there on the outer circumferential surface of the shaft, and wherein the at least one holding arm is preloaded so that it exerts the tensile force on the sensor holder by the coupling to the sensor holder and by the bracing against the outer circumferential surface of the shaft.

5. The measurement assemblage as recited in claim 4, further comprising:
    a pair of holding arms located opposite one another with reference to the sensor holder and the shaft, the pair of holding arms being coupled to the sensor holder at oppositely located points on the sensor holder and surround the shaft in opposite directions in the circumferential direction of the shaft.

6. The measurement assemblage as recited in claim 5, wherein one of the holding arm or pair of holding arms at least one of: (i) abut against the outer circumferential surface of the shaft with arm surfaces or portions thereof which face toward the outer circumferential surface of the shaft, and (ii) surround the shaft in the circumferential direction of the shaft by a total of more than 180° and less than 360°.

7. The measurement assemblage as recited in claim 1, wherein the at least one of the sensor holder and the force element form the at least one bearing point, which is at least one of: (i) embodied as a half-shell bearing, and (ii) set resiliently against the region of the outer circumferential surface of the shaft by the at least one force element.

8. The measurement assemblage as recited in claim 7, wherein the contact points are at least one of: (i) embodied as at least one of plain bearings and plain bushings, as elements inserted into the sensor holder, and (ii) established by the sensor holder as a whole, or a region of the sensor holder which faces toward the shaft, is embodied with or from a low-friction material.

9. The measurement assemblage as recited in claim 7, wherein the at least one of the plain bearings and plain bushings is embodied as partial circle segments each having an arc of less than 180°.

10. The measurement assemblage as recited in claim 9, wherein the sleeve is of cylindrical conformation and having one or more slots in a jacket of the sleeve which extend parallel or obliquely to an axis of symmetry of the sleeve.

11. The measurement assemblage as recited in claim 1, further comprising:
    a twist preventer configured to prevent the sensor holder from rotating along with the shaft, wherein the twist preventer at least one of: (i) is part of the sensor holder, and (ii) has one or more orifices or ribs.

12. The measurement assemblage as recited in claim 1, wherein the region of the outer circumferential surface of the shaft is constituted by a torsion shaft, having or made of at least one of a magnetostrictive material and magnetoelastic material, that is configured for torque transfer as an intermediate shaft piece between first and second shaft segments of the shaft.

13. A crank drive for a vehicle operable with muscle power and/or motor power, the vehicle being an electric bicycle, comprising:
    a shaft that for reception of and nonrotatable coupling to at least one crank for torque transfer; and
    a measurement assemblage for measuring a torsional moment of the shaft, the measurement assemblage including:
    a sensor device to measure a magnetic field carried or generated by the shaft,
    a sensor holder to hold the sensor device and to dispose the sensor device with respect to a region of an outer circumferential surface of the shaft, and
    at least one force element configured to dispose the sensor holder, by force impingement, in stationary fashion with respect to the region of the outer circumferential surface of the shaft, the at least one force element having at least one holding arm, the at least one holding arm being integrally connected to the sensor holder, surrounding the shaft in a circumferential direction of the shaft and being braced there on the outer circumferential surface of the shaft, the at least one force element being configured to exert a tensile force on the sensor holder so that the sensor holder is pulled against the region of the outer circumferential surface of the shaft as a result of the tensile force;

wherein at least one of the sensor holder and the force element form at least one bearing point, wherein the at least one bearing point defines one or more contact points between the shaft and the sensor holder, wherein the contact points are embodied as at least one of plain bearings and plain bushings, and wherein the at least one of the plain bearings and plain bushings are constituted by a sleeve, which is insertable into the force element.

14. The crank drive as recited in claim 13, wherein the at least one of the sensor holder and the force element form the at least one bearing point, which is at least one of: (i) embodied as a half-shell bearing, and (ii) set resiliently against the region of the outer circumferential surface of the shaft by the at least one force element.

15. The crank drive as recited in claim 14, wherein the contact points are at least one of: (i) embodied as at least one of plain bearings and plain bushings, as elements inserted into the sensor holder, and (ii) established by the sensor holder as a whole, or a region of the sensor holder which faces toward the shaft, is embodied with or from a low-friction material.

16. The crank drive as recited in claim 14, wherein the at least one of the plain bearings and plain bushings is embodied as partial circle segments each having an arc of less than 180°.

17. The crank drive as recited in claim 16, wherein the sleeve is of cylindrical conformation and having one or more slots in a jacket of the sleeve which extend parallel or obliquely to an axis of symmetry of the sleeve.

18. A vehicle operable with muscle power and/or motor power, the vehicle being an electric bicycle, comprising:
a crank drive including a shaft and configured for reception of and nonrotatable coupling to at least one crank for torque transfer, and including a measurement assemblage for measuring a torsional moment of the shaft, the measurement assemblage including: a sensor device configured to measure a magnetic field carried or generated by the shaft, a sensor holder to hold the sensor device and to dispose the sensor device with respect to a region of an outer circumferential surface of the shaft, and at least one force element configured to dispose the sensor holder, by force impingement, in stationary fashion with respect to the region of the outer circumferential surface of the shaft, the at least one force element having at least one holding arm, the at least one holding arm being integrally connected to the sensor holder, surrounding the shaft in a circumferential direction of the shaft and being braced there on the outer circumferential surface of the shaft, the at least one force element being configured to exert a tensile force on the sensor holder so that the sensor holder is pulled against the region of the outer circumferential surface of the shaft as a result of the tensile force;

an electric drive system in the region of the crank drive; and a control unit that to control the electric drive system;

wherein at least one of the sensor holder and the force element form at least one bearing point, wherein the at least one bearing point defines one or more contact points between the shaft and the sensor holder, wherein the contact points are embodied as at least one of plain bearings and plain bushings, and wherein the at least one of the plain bearings and plain bushings are constituted by a sleeve, which is insertable into the force element.

19. The measurement assemblage as recited in claim 18, wherein the at least one of the sensor holder and the force element form the at least one bearing point, which is at least one of: (i) embodied as a half-shell bearing, and (ii) set resiliently against the region of the outer circumferential surface of the shaft by the at least one force element.

20. The measurement assemblage as recited in claim 19, wherein the contact points are at least one of: (i) embodied as at least one of plain bearings and plain bushings, as elements inserted into the sensor holder, and (ii) established by the sensor holder as a whole, or a region of the sensor holder which faces toward the shaft, is embodied with or from a low-friction material.

21. The measurement assemblage as recited in claim 19, wherein the at least one of the plain bearings and plain bushings is embodied as partial circle segments each having an arc of less than 180°.

22. The measurement assemblage as recited in claim 21, wherein the sleeve is of cylindrical conformation and having one or more slots in a jacket of the sleeve which extend parallel or obliquely to an axis of symmetry of the sleeve.

* * * * *